Nov. 4, 1969  H. NERWIN  3,476,474
SLIDE PROJECTOR FOR CORNER PIVOT SLIDE MOUNTS
Filed Sept. 12, 1967  3 Sheets-Sheet 1

HUBERT NERWIN
INVENTOR.

BY
ATTORNEYS

HUBERT NERWIN
INVENTOR.

BY
ATTORNEYS

HUBERT NERWIN
INVENTOR.

United States Patent Office 3,476,474
Patented Nov. 4, 1969

3,476,474
SLIDE PROJECTOR FOR CORNER PIVOT SLIDE MOUNTS
Hubert Nerwin, Rochester, N.Y., assignor to Eastman Kodak Company, Rochester, N.Y., a corporation of New Jersey
Filed Sept. 12, 1967, Ser. No. 667,158
Int. Cl. G03b 23/10
U.S. Cl. 353—108       9 Claims

ABSTRACT OF THE DISCLOSURE

A slide projector for individually displaying a plurality of generally square slide mounts assembled in stacked relation to form a slide pack which is held together by a pivot rod extending through the mounts at one corner of the pack so that each mount can be pivoted about the rod independently of the others. Means are provided in the projector for incrementally moving the entire pack, and successively rotating the slide mounts about the pivot rod to locate each slide, in turn, at a predetermined projection position aligned with the optical system of projector.

BACKGROUND OF THE INVENTION

The present invention relates to projection equipment for image recording slides of the type comprising a slide mount supporting a piece of transparent image bearing film or the like, and more particularly to a slide projector for sequentially projecting images of individual slides pivotally mounted on a rod and assembled into a unitary slide pack.

In order to facilitate displaying a plurality of slides in a predetermined sequence, it is well known to store such slides in a magazine adapted to be received by a projector which includes means for sequentially removing the slides from the magazine, projecting them, and returning them in the same order to the same magazine or to another similar magazine. To prevent the slides from being accidentally removed from the magazine or accidentally rearranged therein, it is also known to pivotally attach each slide to the magazine by means of a corresponding lateral arm, which may be formed either integrally with the slide or as a separate member adapted to be attached thereto, whereby each slide can be pivoted independently out of the magazine and into projection position while remaining positively connected to the magazine structure.

Although various forms of such previously known slide magazines have been widely adopted, any such arrangement inherently requires a separate relatively expensive magazine unit for use with set of slides. Furthermore, the space required to store or transport the slides per se is increased by the magazine structure, in some cases to the extent that an otherwise superior type of magazine and projector combination may be impractical for use by traveling lecturers and the like, to whom compactness for purposes of convenient portability is a major consideration.

The present invention provides the functional advantages of the above-described types of slide magazines, including preventing accidental removal or rearrangement of the slides, while at the same time substantially eliminating both the additional expense of the separate magazine structure and also the bulkiness associated therewith.

SUMMARY OF THE INVENTION

This invention includes within its scope a slide projector for projecting individual slide mounts of relatively rigid somewhat resilient material, preferably plastic, stacked along a pivot rod extending through aligned pivot holes in the individual slides at one corner of the slide stack. The pivot rod is provided at opposite ends of the stack with flanges of greater diameter than the pivot holes and thereby retains a predetermined number of slides in adjacent relation while allowing them to rotate independently in fanlike fashion about the pivot rod.

In one embodiment of the invention, the pivot rod is separable to allow removal of one of its end flanges so that the rod can be inserted through closed circular pivot holes in the slide mounts comprising a slide pack, whereupon the removable flange member is replaced on the rod to prevent accidental separation of the assembled slide pack. In another embodiment, the pivot rod is a one-piece member flanged at both ends, with the pivot hole of each slide mount including a restricted opening communicating with the adjacent exterior corner of the mount, whereby the rod can be forced laterally into or out of the pivot hole of each slide by distorting the somewhat resilient slide mount material to enable the rod to pass laterally through the restricted opening.

To facilitate proper obverse stacking of the slides as the slide pack is assembled and also to insure correct orientation of the pack relative to the slide changing mechanism of a projector in which it is installed, the slides are also provided with similarly disposed edge notches or other edge discontinuities which are located in non-symmetrical relation to the slides so that they are in alignment along an edge of the pack only if all of the slides are similarly obversely oriented.

From the foregoing it will be recognized that when a predetermined number of the slides are assembled properly on the pivot rod, the resulting slide pack comprises a unitary assembly which can be stored or transported conveniently and compactly, without danger of disturbing the slide sequence.

To display the slides, the slide pack is loaded into a corresponding projector with the pack oriented in proper obverse relation to the machine and with the pivot rod at a predetermined positon. Since the slide changing mechanism cannot operate properly and might damage the slides unless the pack is so oriented in the projector, the above-mentioned edge notches or the like cooperate with a mating member in the projector to insure that the pack cannot be moved into engageable relation with the slide changing mechanism if it is not installed correctly. As the projector is operated, the slide pack is moved unitarily along the axis of the pivot rod by increments corresponding to the thickness of the slides, as each slide, in turn, is engaged by the slide changing mechanism and thereby rotated about the pivot rod into a stationary gate structure adapted to support it at a predetermined projection position aligned with the optical system of the projector. After each slide has been displayed while supported in the gate structure, it is again rotated about the pivot rod to return it to its former position in the pack, whereupon the pack is moved sufficiently to align the next slide with the gate so that it can be similarly rotated into projection position. After this procedure has been repeated to display all of the slides in the pack, the pack is removed from the projector, with all of the slides thereof still pivotally retained in their original order along the pivot rod, so that the pack can be stored and displayed again without any reassembly of the pack or risk of accidental rearrangement of the slides.

Various means for practicing the invention and other advantages afforded thereby will be apparent from the following detailed description of illustrative embodiments thereof, reference being made to the accompanying drawings in which like reference numerals refer to like elements.

DESCRIPTION OF A PREFERRED EMBODIMENT

Figure 1:
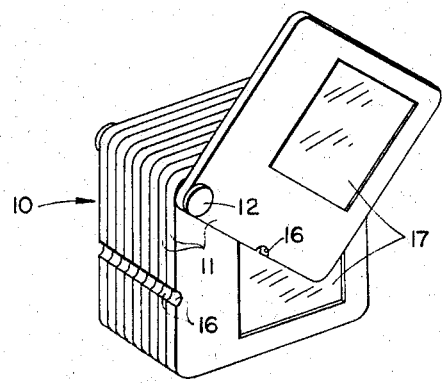
FIG. 1 is a perspective view of a vertically positioned slide pack according to the present invention, showing one of the slides pivoted out of alignment with the other slides comprising the pack.
Figure 2:
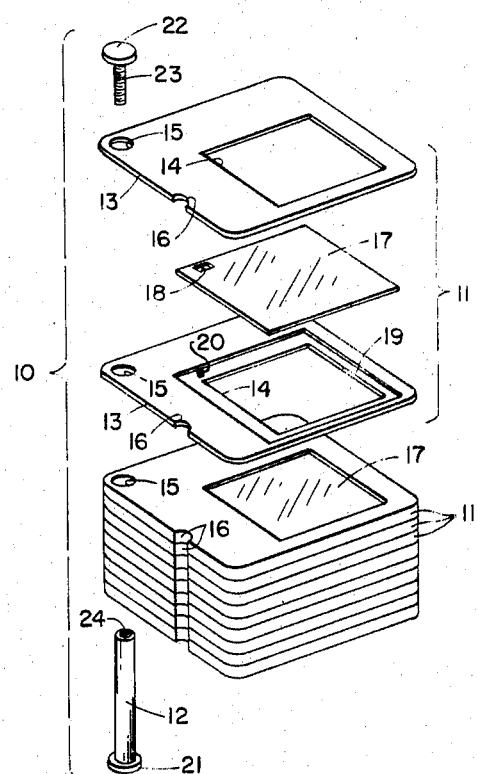
FIG. 2 is a partially exploded view of the slide pack shown in FIG. 1, disposed in a horizontal position, illustrating the individual components comprising one of the slides and the manner in which the slides are pivotally joined by the pivot rod.

Referring first to FIGS. 1 and 2 of the drawings, it will be seen that a slide pack 10 for use with the slide projector of the present invention comprises a plurality of substantially square slides 11 provided with rounded corners and pivotally held together by a pivot rod 12 so that each slide can pivot about the rod independently of the others. As shown in FIG. 2, which illustrates one of the slides in unassembled form to depict its component parts, each slide includes a slide mount comprising a pair of substantially similar generally square slide mount members 13, each of which is provided with a square image aperture 14, a corner hole 15, and an edge notch 16 located off-center along one edge of the mount member. To assemble each slide, the two mount members are positioned as shown in FIG. 2 with their respective apertures 14, holes 15 and edge notches 16 in opposed alignment with each other. An image bearing transparency member 17, comprising a piece of photographic film or similar transparent material, is provided with an edge perforation 18 in predetermined non-symmetrical relation to the image recorded on the central image area thereof and is adapted to be positioned in recess 19 in one of the mount members when oriented so that the metering perforation can receive fixed projection 20 extending into the recess; thereby insuring a predetermined mode of orientation between the slide mount and the image recorded on the transparency member. The mount members are then placed together and cemented or permanently joined in some other manner along their contacting surfaces, with the marginal portion of the transparency member sandwiched between the mount members within the recess and with the aligned holes, apertures and notches cooperating to define corresponding openings in the assembled slide mount. Thus, the transparency member is permanently mounted in flat relation in the assembled slide mount with its central image area aligned with apertures 14 and offset diagonally relative to the mount member toward the corner thereof opposite the corner pivot hole defined by the aligned corner holes 15 in the two mount members.

It should be understood that although the slide mounts preferably are formed of plastic material, other materials could also be used for that purpose, and, similarly, that the invention could be practiced with slide mounts other than those comprising a two-piece laminated assembly.

To assemble the illustrated slide pack, ten slides are stacked in any desired sequence with their edge notches and their corner pivot holes in alignment, so that the image areas of the slide transparencies are all oriented in the same sense. The pivot rod 12 is then fed through the aligned corner pivot holes to locate its end flange 21 against the end face of the slide at the adjacent end of the pack, whereupon the removable flange member 22 is attached to the opposite end of the rod by screwing threaded shank 23 into a mating threaded hole 24 in the pivot rod. To insure free movement of the slides about the pivot rod, the length of the rod is such that when ten slides of uniform predetermined thickness are stacked thereon, the removable flange can be screwed tightly onto the rod to maintain the slides in close adjacency to one another without actually squeezing them together. It should be obvious, of course, that a slide pack need not necessarily include ten slides, as illustrated, but that the pivot rod should correspond in length to the number of slides assembled together to retain them in adjacent face-to-face contact.

Figure 3:
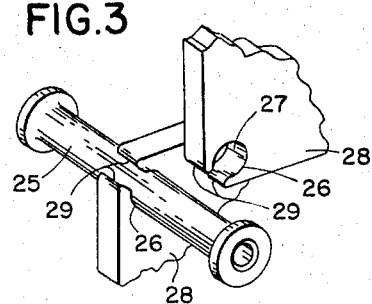
FIG. 3 is an enlarged perspective view of a pivot rod and portions of two corresponding slides according to an alternate embodiment of the invention, showing the manner in which the slides are laterally installed on and removed from the one-piece pivot rod to assemble or rearrange a slide pack.

FIG. 3 shows an alternate embodiment of the pivot rod and corner pivot hole structure of a slide pack comprising slide mounts otherwise identical to those previously described. In this embodiment, the pivot rod 25 is a one-piece tubular member of predetermined length permanently flanged at both ends and adapted to be received in the circular portions 26 of corner pivot holes 27 extending through slide mounts 28, which are formed of sufficiently resilient material to allow the rod to be forced laterally into the pivot holes through restricted corner openings 29 by expanding the openings to allow passage of the rod therethrough. This arrangement, therefore, not only simplifies the construction of the pivot rod, but also facilitates assembling and editing the slide pack by allowing any slide to be removed and replaced or repositioned without removing the other slides from the rod.

Figure 4:
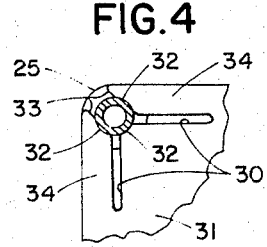
FIG. 4 is a partial elevational view of the pivot corner of a slide comprising a variation of the embodiment shown in FIG. 3, depicting in cross section the pivot rod received within the pivot hole.
Figure 5:
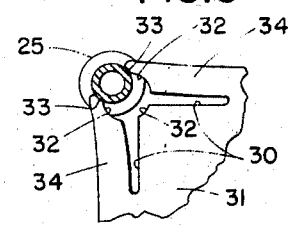
FIG. 5 corresponds to FIG. 4 and shows the manner in which portions of the slide adjacent the pivot hole are resiliently deformed to allow the pivot rod to be received laterally into the pivot hole.

FIGS. 4 and 5 show a modification of the pivot rod portion of the slide mount illustrated by FIG. 3, whereby a pair of elongate slots 30 are provided in each slide mount 31, extending from the circular portions 32 of the pivot hole in parallel relation to the adjacent edge surfaces of the slide mount. When the slide is attached to the previously described tubular pivot rod 25, the rod is reecived in the circular portions of the hole, as shown in FIG. 4, beyond the restricted corner opening 33 defined between the opposed ends of elongate arms 34, which extend along corresponding edges of the slide mount adjacent slots 30. As the rod is forced laterally into or out of the pivot hole, as depicted in FIG. 5, the corner opening is expanded by flexing the arms outwardly. Accordingly, as compared to the structure shown in FIG. 3, this corner configuration substantially reduces the distortional stress on the mount as the rod is installed or removed and enables such operation to be performed with less force, by allowing the arms to flex throughout their lengths rather than concentrating such flexure immediately adjacent the corner opening.

Figure 6:
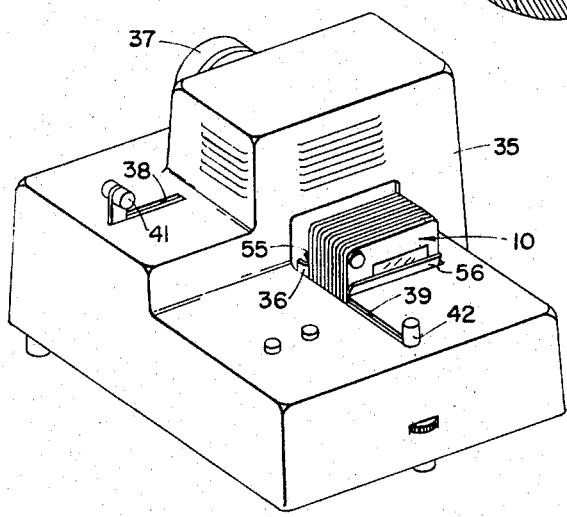
FIG. 6 is a reduced perspective rear view of a preferred embodiment of a slide projector adapted to receive and display a slide pack according to the invention.

FIG. 6 shows the external appearance of an illustrative slide projector constructed in accordance with a preferred embodiment of the invention for receiving a slide pack of the type described above and to display, in sequence, the ten slides of which the pack is comprised. A housing 35 substantially encloses the internal components of the projector and is provided with an opening 36 through which a slide pack 10 can be loaded into or removed from the unit. A lens tube 37 is positioned along a horizontal axis extending above the slide pack and is supported by the housing, which is also provided with slots 38 and 39 adapted respectively to allow manual sliding movement of slide changing handle 41 and transfer knob 42.

Figure 7:
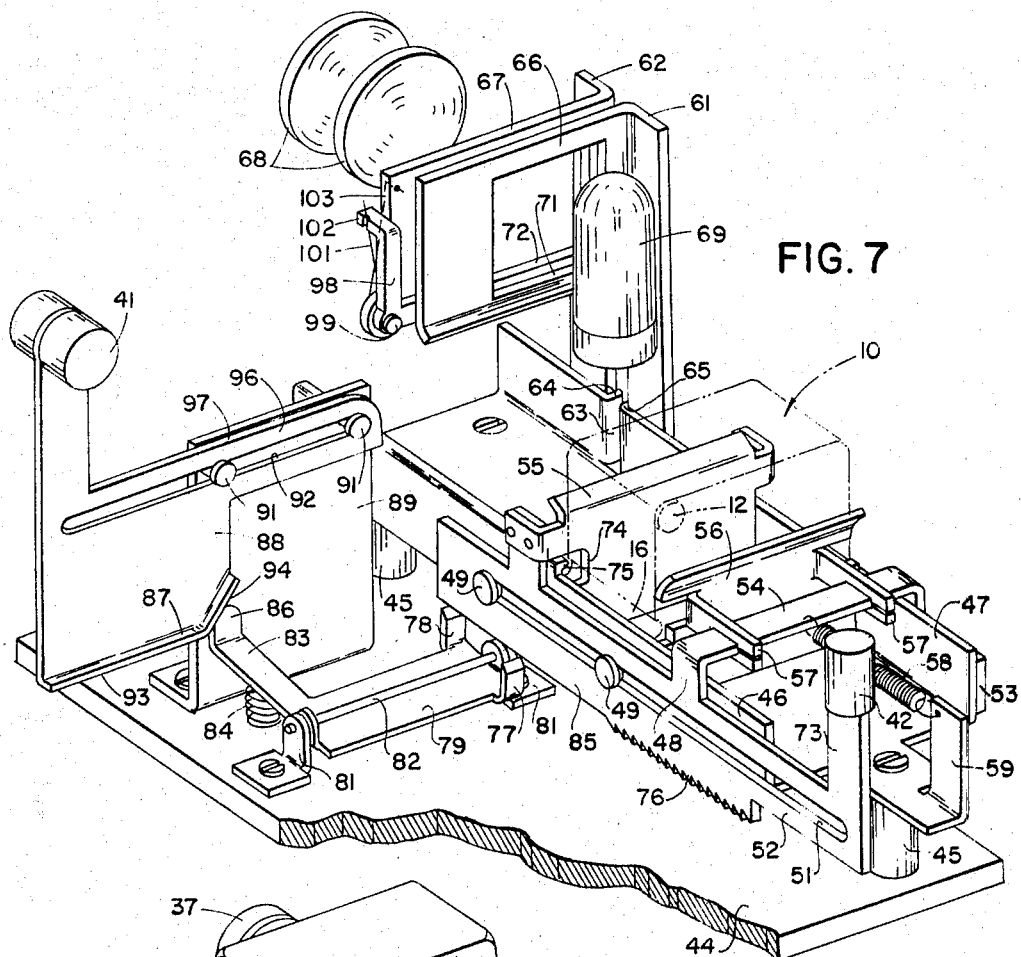
FIG. 7 is a perspective rear view of the internal mechanism of the projector shown in FIG. 6, with the various elements thereof positioned to receive a slide pack loaded into the projector as shown in broken lines.

The principal internal components of the projector unit are illustrated by FIG. 7 with the movable elements thereof shown positioned to receive a slide pack to load the projector.

Directly below opening 36 in the housing, a channel member 43 is supported on an internal base plate 44, by spacer sleeves 45. The upwardly bent side flanges 46 and 47 of the channel member are spaced apart by a distance corresponding to the width of the slides, and serve to support slide transport member 48 which is slidably mounted by pins 49 extending through flange 46 by pins 49 extending through elongate slot 51 in side plate 52 of the transport member and by corresponding means mounting the opposite side plate 53 to flange 47. The two side plates of the transport member are joined by a cross bar 54 and by a vertical transverse plate 55 extending downwardly between the flanges. A second vertical transverse plate 56, which also extends downwardly between the flanges, is supported behind plate 55 by slotted support ears 57 bent into gripping engagement with the cross bar, with the facing surfaces of the two transverse plates spaced apart by a distance corresponding to the thickness of a slide pack. As shown at 58, an extensible coil spring is connected between the cross bar and an upright leg 59 on the channel member to urge the transport member toward its illustrated rearwardmost position defined by the engagement of the forward end of slot 51 with the adjacent pin 49. In this position, the transverse plates are aligned with opening 36 in the housing, to enable a slide pack to be inserted into the projector through that opening and between the rounded upper edges of the transverse plates, so that the pack is supported forwardly and rearwardly in immovable relation to the transport member by the opposed flat surfaces of the transverse plates, and laterally between the side flanges of the channel members, as shown in broken lines in FIG. 7.

Toward the front end of channel member 43, a pair of rigid vertical support members 61 and 62 are located at opposite sides of a vertical opening 63 in side flange 47, such opening being defined between outwardly bent flange ears 64 and 65 which are spaced apart by a distance only slightly greater than the thickness of one of the slide mounts. At their upper ends, the vertical support members are provided respectively with parallel gate members 66 and 67, supported vertically at right angles to the axis of the projector's optical system, represented by objective lens system 68 and projection lamp 69. The gate members are spaced apart by a distance corresponding to the thickness of a single slide and are provided with aligned apertures 71 and 72, concentric with the optical axis of lens system 68. Thus, when a slide is received between the gate members with its transparency member aligned with the gate apertures, the image bearing surface of the transparency member will be located along the optical axis in a predetermined position at which a sharp image of that surface can be focused on a projection screen by the lens system.

When the slide pack has been loaded into the projector, it is moved manually along the channel member toward the front of the projector by sliding the transport member forwardly against the influence of spring 58 by means of transport knob 42, which is attached to the transport member by a vertical leg 73 extending upwardly from side plate 52. If the slide pack is oriented properly in the projector, the edge notches 16 along one side of the pack will be aligned with opening 74 in transverse plate 55 and with an inwardly facing lip 75 extending along the top edge of the forward portion of side flange 46, whereby the lip will be received in the aligned edge notches without interfering with such movement. However, if the pack is not so oriented, the lip will be engaged by the corresponding edge surface of the forwardmost slide mount, thereby blocking further movement of the slide pack before it is in a position accessible to the slide changing mechanism and alerting the operator to remove the pack and reposition it correctly.

As the properly oriented slide pack is moved forwardly in the projector by the transport member, an escapement rack 76 along the lower edge of side plate 52 moves into vertical alignment with pallet teeth 77 and 78 of pallet member 79. The pallet member is supported on the base plate for rocking pivotal movement by brackets 81 and 82 and is provided with a release arm 83 biased upwardly by a weak coil spring 84 to urge pallet tooth 78 toward engagement either with the smooth lower edge surface 85 of side plate 52 or with the escapement rack, depending on the position of the transport member. The forward end of the release arm includes a cam follower ear 86 located below cam lip 87 along the lower edge of slide rotating member 88, which is supported for horizontal sliding movement on vertical support plate 89 by pins 91 extending through slot 92. As will be explained below in greater detail, the cam lip includes a horizontal lower portion 93 and a sloped end portion 94, the latter being located above ear 86 when the slide rotating member is in the position shown in FIG. 7.

Figure 10:
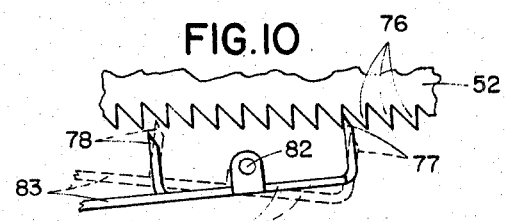
FIG. 10 is an enlarged partial side elevational view of a portion of the escapement mechanism shown in FIGS. 8 and 9, which controls the movement of the slide pack to laterally align successive slides thereof with the projector gate.

Each tooth of the escapement rack is exactly as wide as the thicknes of one of the slide mounts and, as best shown by FIG. 10, each rack tooth includes a vertical rear face and sloped front face, whereas the ends of the pallet teeth include similarly sloped rear faces and vertical front faces. Accordingly, as the rack moves forwardly, the front pallet tooth 78 is cammed downwardly by each successive rack tooth against the resistance of spring 84 as the other pallet tooth enters the space between the pair of rack teeth immediately above it, whereby the pallet member simply oscillates about its pivot shaft without blocking the forward movement of the transport member. When the transport member reaches its extreme forward position, defined by the abutment of the rearward end of slot 51 against rearward pin 49, it is latched in that position against the rearward force of spring 58, by the engagement of pallet tooth 78 with the rearward surface of the adjacent rack tooth. In this position, the rearward slide in the slide pack is positioned slightly ahead of the slide receiving space between the gate members and in similar relation to the slide rotating member, which is centrally supported between the planes defined by the spaced confronting surfaces of the gate members.

Figure 8:
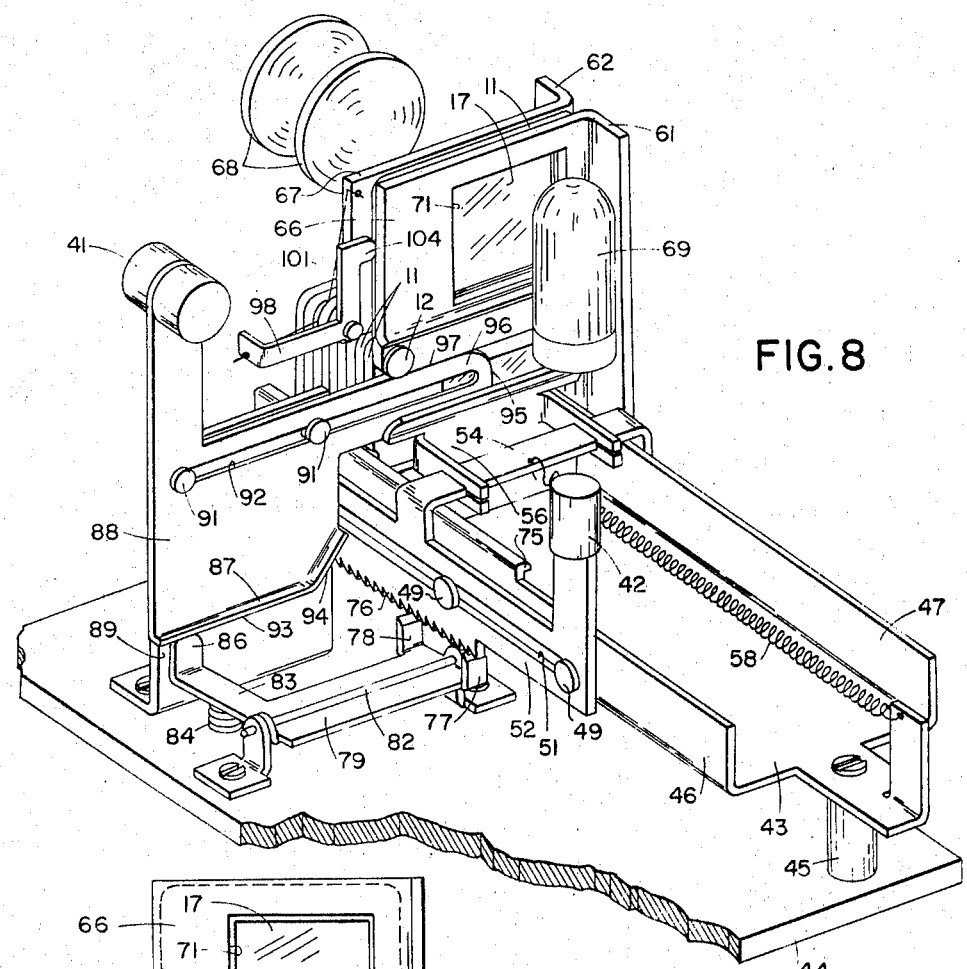
FIG. 8 corresponds to FIG. 7 and shows the respective positions of the projector components and the slides comprising a slide pack therein when one of such slides is positioned in the projector gate for projection of an image thereof.

To display the first slide, i.e. the rearwardmost slide in the pack, slide changing handle 41 is moved manually along slot 38 toward the optical axis of the projector to move the slide rotating member in the same direction. During the initial stage of such movement, and before the slide rotating member comes into engageable relation to the slide pack, the cam lip thereon is displaced sufficiently to cam ear 86 downwardly into contact with lower portion 93 of the lip, thereby rocking the pallet member to the position shown in FIG. 8 and in solid lines in FIG. 10. Such movement of the pallet member disengages the front pallet tooth 78 from the rack as the rear pallet tooth 77 enters the space between the two rack teeth positioned above it. Therefore, as the front pallet tooth releases the rack, spring 58 moves the transfer member rearwardly through a distance less than the width of a rack tooth to a position defined by the engagement of the rear pallet tooth with the vertical face of the adjacent rack tooth, such movement being sufficient to move the first slide into accurate lateral alignment with the gate and with the slide rotating member.

As the movement of the slide rotating member continues, the adjacent edge of the slide mount aligned with the slide rotating member is engaged below the pivot rod by the rounded end portion 95 of a thin horizontal slide rotating arm 96 projecting laterally from that member. Accordingly, as the slide rotating member completes its movement to the position shown in FIG. 8, the slide mount engaged by arm 96 is thereby moved rotatively about the pivot rod between flange ears 64 and 65 and vertical support members 61 and 62 and into projection position between gate members 66 and 67. Since opening 63 in slide flange 47 of the channel member is aligned with and only slightly wider than the thickness of the slide mount engaged by arm 96, it is apparent that such rotational movement of that slide does not disturb the positions of the other slides in the pack, which are restrained against similar movement by the slide flanges of the channel member.

Figure 9:
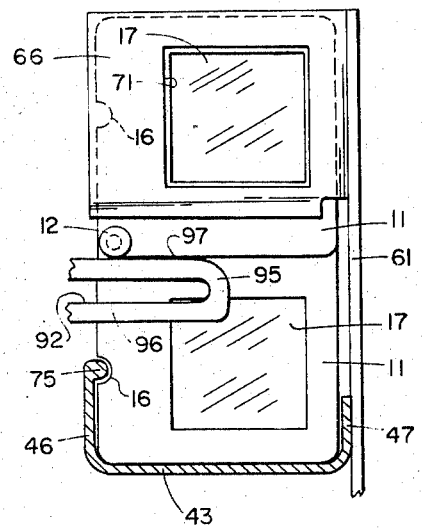
FIG. 9 is an end elevational view corresponding to a portion of FIG. 8, illustrating more clearly the manner in which one of the slides in the pack is pivoted into projection position.

When the slide rotating arm has been moved to the end of its movement path established by the abutment of the opposite end of slot 92 with the adjacent pin 91, the horizontal upper edge surface 97 of the arm serves to support the raised slide with the transparency member thereof accurately aligned with the gate apertures, as is most clearly illustrated by FIG. 9. Thus, the slide is positioned properly for projection of a focused image of its image bearing surface and will remain so positioned until arm 96 is subsequently withdrawn from the slide pack.

As indicated by numeral 98, a bifurcated lever is attached to gate member 67 by a pin 99 and is pivotally biased by a spring 101 toward a position established by the engagement of ear 102 with edge surface 103 of that gate member, in which position nose portion 104 of the lever is located between the two gate members just above the slide pack. Therefore, as the slide is rotated into projection position, it engages the nose portion of the lever and pivots the lever to the position shown in FIG. 8 against the influence of spring 101, so that the lever laterally exerts a resilient pivotal force on the slide, tending to rotate it back to its initial position in the pack.

After the slide in the gate has been displayed, handle 41 is moved manually back toward its initial position to withdraw slide rotating arm 96 from slide pack pack so that the slide mount supported thereby can rotate back to its previous position in the pack under the influence of its own weight and the supplemental force of spring bisaed lever 98. Until such return movement of the slide rotating member has withdrawn the arm sufficiently to allow the slide mount to be rotated back into the pack, the lower portion 93 of cam lip 87 continues to depress ear 86 of the pallet member to prevent rearward movement of the transport member by spring 58. During the final stage of such return movement of the arm, however, after the slide is returned to the pack, the sloped end portion 94 of the cam lip moves into alignment with the cam follower ear and allows the pallet member to be rocked back to the position shown in FIG. 7 and in broken lines in FIG. 10. Accordingly, pallet tooth 77 disengages the rack and allows the transport member to move rearwardly by somewhat less than the distance required to bring the succeeding slide into lateral alignment with the gate, before again being blocked by the engagement of pallet tooth 78 with the vertical edge of the adjacent rack tooth. At this stage of the operation of the projector, all of its movable components have been restored to the respective positions which they assumed just prior to rotation of the first slide into projection position, except that the transport member is now positioned rearwardly of its former position by the width of one rack tooth so that operation of the slide rotating member will now move the succeeding slide into the gate. Thus, it should be apparent that each successive operation of the slide changing handle will cause a succeeding slide to be displayed. When the last available slide has been rotated back into the pack, the front tooth along the escapement rack will have moved beyond pallet tooth 78 to allow the transport member to be returned by spring 58 to the position shown in FIG. 7, so that the pack can be removed from the unit and another pack installed therein.

Although the foregoing description relates to a specific embodiment of the invention, it is obvious that variations and modifications thereof can be effected within the spirit and scope of the invention.

I claim:
1. A slide projector adapted to receive a unitary slide pack comprising a plurality of flat substantially rectangular image bearing slides pivotally supported with adjacent portions of the face surfaces thereof in contact by an elongate pivot rod extending in perpendicular relation to said slides through aligned pivot holes in said slides inwardly adjacent corresponding corners thereof and to display consecutively images of successive ones of said slides received by said projector, said projector comprising:
    optical means,
    gate means adapted to support a slide received therein to produce by said optical means a projected image of an image bearing portion of that slide,
    a support member engageable with edge surfaces of said slides to support said pack received in said projector for movement along a path parallel to the axis of said rod,
    a stationary guide member laterally adjacent said pack along said path of movement thereof,
    transport means adapted to move said pack along said path by successive increments corresponding to the thickness of said slides to successively position succeeding ones of said slides in lateral alignment with said gate means,
    means defining an opening in said stationary guide member laterally adjacent only the one of said slides laterally aligned with said gate means, and
    a slide rotating member moveable into engagement with an edge surface of said one slide aligned laterally with said opening and said gate means to rotate said one slide about said pivot rod through said opening and into reception by said gate means.

2. A projector according to claim 1 including:
    means operatively connecting said slide rotating member with said transport means to effect each successive incremental movement of said pack in response to a predetermined movement of said slide rotating member.

3. A projector according to claim 1 including means cooperable with an edge surface discontinuity of said pack received thereby to prevent movement of said pack along said path into lateral alignment with said gate means unless said pack is in a predetermined mode of orientation relative to said projector.

4. A projector according to claim 1 in which said transport means includes:
    end support means adjacent opposite end surfaces of said pack received in said projector and movable with said pack along said path,
    resilient means tending to move said end support means and said pack received therebetween in a predetermined direction along said path, and
    successively operable escapement means operatively connected to said end support means to allow said resilient means to move said end support means and said pack received therebetween along said path in said predetermined direction by a successive one of said increments in response to each successive operation of said escapement means.

5. The invention defined by claim 4 in which said escapement means includes:

a rack member comprising a plurality of rack teeth uniformly disposed therealong at intervals corresponding to the thickness of each of said slides, and a movably operatable latch tooth member adapted to engage a successive one of said teeth in response to each successive operation of said latch tooth member.

6. A slide projector adapted to receive a slide pack comprising a plurality of structurally identical flat substantially rectangular slides pivotally supported in adjacent fanlike relation along a pivot rod perpendicular to said slides and extending through aligned pivot holes in said slides inwardly adjacent corresponding corners thereof, said projector comprising:

a slide support member including opposed parallel wall means spaced apart by a distance corresponding to the width of said slides, said slide support member being adapted to receive said pack between and in perpendicular relation to said walls with all of said slides thereof maintained in direct alignment with one another by said wall means, gate means laterally adjacent said slide support member for supporting at a predetermined location a portion of a slide positioned therein, transport means operable to move said slide pack incrementally along said slide support member to position successive ones of said slides in lateral alignment with said gate means, means defining in said support member an opening aligned laterally with said gate means to accommodate pivotal movement about said rod of only said one of said slides positioned in lateral alignment with said gate means, and slide rotating means operable to engage said one of said slides laterally aligned with said gate and to rotate said one slide about said rod and through said opening to move a portion of said one slide into supported position in said gate means.

7. A projector according to claim 6 including:

manually movable means for operating said slide rotating means, and linkage means operatively connecting said slide rotating means with said transport means to coordinate the incremental movement of said slide pack by said transport means with the operation of said slide rotating means by said manually movable means.

8. A projector according to claim 6 in which said slide mounts through aligned pivot holes in said slide perpendicular to said wall means between the planes defined by opposite faces of said one slide laterally aligned with said gate means.

9. A slide projector adapted to receive a slide pack comprising an aligned stack of structurally identical substantially rectangular flat slide mounts pivotally connected by a pivot rod extending perpendicularly to said slide mounts through aligned pivot holes in said slide mounts adjacent one corner of said slide pack, said slide mounts including edge surface means defining a localized laterally receding edge surface discontinuity in parallel relation to said pivot rod along an edge surface of said slide pack in non-symmetrical relation to the lateral profile of said slide pack, said projetctor comprising:

a slide changing mechanism, support means adapted to support said slide pack for movement into lateral alignment with said slide changing mechanism along a path parallel to the axis of said pivot rod, and abutment means adapted to be accommodated by said edge surface discontinuity during such movement of said slide pack if said slide pack is in a predetermined mode of orientation relative to said support means and to abut with said slide pack to prevent such movement thereof if said slide pack is otherwise oriented relative to said support means.

References Cited
UNITED STATES PATENTS

| | | | |
|---|---|---|---|
| 2,982,177 | 5/1961 | Briskin et al. | 353—103 |
| 3,121,368 | 2/1964 | Hall | 353—118 |
| 3,279,109 | 10/1966 | Whittum | 540—106.1 |

HARRY N. HAROIAN, Primary Examiner